United States Patent Office 2,744,891
Patented May 8, 1956

2,744,891

PROCESS FOR PRODUCING A WATER-SOLUBLE CASEIN

David F. Waugh, Watertown, Mass., assignor to National Dairy Research Laboratories, Inc., Oakdale, N. Y., a corporation of Delaware No Drawing. Application September 24, 1952, Serial No. 311,311

8 Claims. (Cl. 260—120)

This invention relates to a process for preparing casein from skim milk and to a water soluble casein obtainable by this process.

Casein is the principal protein of milk, and exists therein in association with calcium, forming, in the case of cows' milk, nearly 3% of the solids content of milk. Chemically casein can be characterized as a phosphoprotein, and Linderstrøm-Lang and Kodama, Compt. rend. trav. lab. Carlsberg, 16, No. 1 (1925) showed it to be a mixture of two or more proteins, presumably similar in chemical composition. This was confirmed by Mellander, Biochem. Z., 300, 240 (1939)) and Warner, J. Am. Chem. Soc., 66, 1725 (1944), who isolated fractions identified as $\alpha$, $\beta$ and $\gamma$ caseins.

The dry casein of commerce is a yellowish white powder which is a mixture of the naturally occurring caseins, and is not readily wetted by water or aqueous solutions. The chemical literature reports it to be very sparingly soluble in water, alcohols and most neutral solvents (see The Condensed Chemical Dictionary, Fourth Edition, Reinhold Publishing Corporation (1950), page 145, Hackh's Chemical Dictionary, Third Edition, The Blakiston Company (1944), page 173, The Merck Index, Sixth Edition, Merck & Co., Inc. (1952), pages 207–8, and Kingzett's Chemical Encyclopaedia, Sixth Edition, D. Van Nostrand Company, Inc. (1940), page 166). It will dissolve readily in aqueous solutions of alkali or of the common alkaline salts, if previously wetted with a small quantity of the solution. It is insoluble in cold dilute inorganic acids, but on warming in contact with acid, hydrolysis may take place.

Casein ordinarily is prepared by precipitation from its dispersion in milk. Any of several methods can be used, including addition of acid to bring the pH to the isoelectric point of casein, or by the action of rennet, or by heating, or by the addition of alcohol or salts.

Casein "nach Hammarsten" is prepared by diluting skim milk with four times its volume of water and adding dilute acetic acid until the casein precipitates. The casein is then purified by rapidly dissolving it in dilute alkali, filtering and reprecipitating with acetic acid. If the product is dried thoroughly, it is difficult to wet with water; if it is dried only to a point where it contains traces of water, it is readily wetted by water, but in either case it is water-insoluble.

Various modifications of the Hammarsten method have been proposed. According to Robertson (J. Biol. Chem., 2, 317 (1907) and J. Phys. Chem., 14, 528 (1910)) casein "nach Hammarsten" contains a small amount of a water-soluble substance which can be removed by triturating with distilled water, absolute ethanol and ether. This product when dried is white and is also water-insoluble. To wet it, it is necessary first to rub it to a paste with a small amount of the solvent.

Van Slyke and Bosworth, J. Biol. Chem., 14, 203 (1913), describe a method for removing phosphate, which they allege contaminates Hammarsten casein. In their process, skim milk is diluted with water and the casein precipitated by addition of acetic acid. The precipitated casein is separated and then is washed several times with distilled water and dissolved in ammonium hydroxide. The solution is filtered and the casein reprecipitated by addition of acetic acid. This procedure is repeated at least four times. Finally, an excess of concentrated ammonium hydroxide solution is added, followed by a saturated ammonium oxalate solution. The liquid then is centrifuged and filtered and the casein precipitated from the filtrate by dilute hydrochloric acid, washed until free from chlorides and dried as described above. This product likewise is water-insoluble and is not readily wetted by water.

More recently, these investigators (Tech. Bull. 65, N. Y. (Geneva) Agr. Expt. Sta. (1918) and Chem. Age, 32, 163 (1924)) have described a somewhat different method. Fresh milk is treated with 1 N lactic, hydrochloric or acetic acid with stirring. After all the casein is precipitated, the liquid is centrifuged and the casein washed with water and centrifuged four or five times. The casein then is suspended in alkali and additional alkali added to a pH of 7. Calcium and magnesium phosphates precipitate and are removed by centrifuging. The casein then is precipitated by addition of acetic acid at a pH of 4.7. The casein is centrifuged, resuspended in water and electrolyzed to remove traces of phosphate and finally treated with anhydrous solvents. This process is said to give a casein free from inorganic phosphorus, calcium and hydrolytic products, but the casein obtained is nonetheless water-insoluble and is not readily wetted by a solvent when it is fully dried.

Cohn and Hendry, Organic Syntheses, 10, 16 (1930), have modified the above method slightly, dissolving the casein in alkali at a pH of 6.3 and then filtering to remove calcium caseinate as well as calcium phosphate and fat, but the product does not differ materially in its physical properties.

Commercial casein is generally made either by precipitation with acid or by coagulation with rennet. Rennet casein is largely used for plastics manufacture, while acid-precipitated casein is employed for other commercial uses.

In the manufacture of rennet casein, skim milk is warmed to 96° F. and curdled with rennet, after which the curd is broken up and gradually heated to 130 to 150° F. After settling for 10 minutes, the curd is drained of whey, washed several times with water, pressed, shredded and dried in thin layers at 110 to 115° F. This product is water-insoluble, but can be dissolved in dilute alkali.

Acid-precipitated casein is obtained either by adding hydrochloric or sulfuric acid to skim milk or by the action of lactic acid produced by fermentation of lactose when the milk sours. Hydrochloric acid is the preferred reagent because sulfuric acid leads to a whey containing calcium sulfate whose limited solubility complicates the separation of lactonse. The milk is heated to an elevated temperature approximating 96° C. and the curd which forms is separated by any of several accepted methods.

It will be noted that in the above procedures the casein is isolated from milk after it has been brought to an insoluble condition by some technique. Even though the casein is later treated by various modifying procedures, such as methods for removing calcium, phosphate and other materials, the final product retains the condition thus imparted to it, is not readily wetted by water and, if it dissolves in water at all, it dissolves so slowly and to such a limited extent that it must be regarded as water-insoluble.

In accordance with the instant invention, casein is isolated from milk by a process which does not change the soluble condition in which casein exists in milk. This procedure includes the steps of increasing the calcium ion concentration of the milk to within the range from 0.05 to 0.1 molar, preferably about 0.06 to 0.08 molar, separating casein from the milk, and then removing ionic calcium associated with the separated casein to reduce the casein calcium content to below about 0.2% based on the dry weight of the casein. Ionic calcium is removed in an aqueous medium with the aid of a calcium sequestrant, and if a salt-free casein is desired, this can be supplemented by ion exchange methods to remove other ions.

The casein obtained by this process is characterized by a high solubility in water, in which it dissolves easily and rapidly. The casein is compatible with skim milk and can be used to increase the protein content of skim milk without apparent change in the character of the milk, except for the increased solids content. Solutions of the casein of the invention in distilled water have a characteristically low light scattering indicative of the small monomer size. Solutions containing up to 30% casein are readily prepared and even solutions of these high solids concentrations do not have an appreciably increased viscosity. If the distilled water solution of the casein is evaporated to dryness, a glass is obtained from which the casein flakes off as dry particles which are readily dissolved in water.

The characteristically low calcium content of the soluble casein, below about 0.2% to as low as 0.05% or even lower, indicates that most of the phosphoric acid groups bound to the casein do not carry calcium ions, but rather sodium, potassium or hydrogen ions, depending upon the methods used to treat the casein following its separation from the milk.

The compatability of the soluble casein with milk and casein solutions is indicative that the casein is in a condition closely approximating its natural condition. Upon dissolving the casein in the skim milk and supplying calcium ion, the casein evidently returns to a state very similar, if not identical, to the state in which it exists in milk and gives no indication of having been denatured in any way. When solutions of casein in water or skim milk are cooled, the casein does not precipitate, in contrast to a solubilized isoelectric casein. The casein of the invention is capable of stabilizing other solutions of casein against precipitation when cooled.

ISOLATION OF CASEIN FROM MILK

Addition of calcium ion to skim milk in the first step of the process displaces the particle size of the casein towards the formation of aggregates or micelles of larger size but without a chemical alteration in the casein structure. In general an increase in calcium ion concentration increases micellar size, but at 0.07 to 0.10 molar, the useful limit is reached, beyond which a further increase in calcium ion does not lead to an increase in micellar size which will permit an easier separation of the casein. It is not advantageous to use more calcium ion than the minimum necessary to achieve complete separation of casein, since this would increase the amount of calcium to be removed later. In general, calcium ion added to give a calcium concentration of 0.10 molar or less is desirable, while amounts within the range of 0.06 to 0.08 molar are preferred.

Any water-soluble nondeleterious calcium compound is a good source of calcium ion, for example, calcium chloride.

The pH of the milk is not critical. However, it should not be as low as the isoelectric point of casein, i. e., 4.6 to 4.7. On the other hand, it should not be so high on the alkaline side as to induce dissociation or chemical alteration of the casein complexes. These factors suggest a pH range within from 4.7 to about 7.5. A pH of from 5.3 to 6.5 is preferred as providing an adequate safeguard against both isoelectric precipitation of casein and against dissociation and chemical alteration of the casein.

Association of the casein micelles increases with temperature, and at the same time the solubility of the casein micelles decreases. At a temperature of about 60° C. there is produced within a few minutes a granulation of the casein micelles of the milk which greatly simplifies the separation of casein. This granulation produces little change in the chemical properties of the casein which separates as a result thereof. However, granulation is not essential and, remembering that the separation procedure is governed by micellar size, temperatures down to the freezing point of the milk can be employed if desired. Above 60° C. general protein denaturation may occur, but otherwise the temperature at which micelle association is effected is not critical.

The casein can be separated by any of several procedures. Centrifuging is a preferred process and although the minimum acceleration which is required to separate substantially all of the casein is preferred, i. e., from 1 to 20,000×g, any higher acceleration, say up to 150,000×g, can be used short of that which leads to a disruption or destruction of the milk or the separation of other protein or contaminating materials not readily removed from the casein centrifugate. When centrifuging is employed, low temperatures can be used, within the range from 0 to 15° C., in order to achieve a more complete separation.

The casein also can be separated by filtration, particularly where the granular precipitate is obtained.

Salting out the casein through addition of inorganic salts is another alternative procedure, but since this appreciably increases the salt concentration of the solution, with the possibility of contamination of the casein with such salts which later have to be removed, it would not be employed in preference to centrifuging or filtration.

The precipitate resulting from the first centrifugation or other separation technique may be expected to contain small amounts of supernatant trapped in its interstices and therefore if it is desired to prepare a casein of such purity that it can be used as reagent-grade material, the removal of such supernatant with its dissolved whey proteins, lactose, etc., will be required.

This can be accomplished by resuspending the precipitate in an aqueous buffer solution containing calcium ion in an approximately 0.05 molar concentration and 0.7% sodium chloride and recentrifuging or otherwise recovering the precipitate. Such a washing procedure may be repeated as many times as may be necessary.

REDUCTION OF CASEIN CALCIUM CONTENT

The separated casein then is treated to remove ionic calcium associated therewith in the presence of an aqueous medium. To effect this, the casein can be dispersed or homogenized in water. The minimum amount of water necessary to disperse the casein should be used since this will facilitate the removal both by reducing the volumes of material which have to be treated and by permitting one to operate with more concentrated solutions.

Calcium ion can be precipitated or removed from the casein by addition of a calcium sequestrant. The term "sequestrant" as used herein refers to materials capable of precipitating calcium ion in the form of a water-insoluble salt or of removing calcium ion by association in soluble slightly ionized complexes. Exemplifying the first type of sequestrant are compounds, i. e., acids or salts, supplying oxalate, orthophosphate, and carbonate ion such as sodium and potassium oxalates, orthophosphates and carbonates, and oxalic, and orthophosphoric acids. Sequestrants of the latter type include ethylene diamine tetraacetic acid, citric acid, lactic acid, trimethylamine tricarboxylic acid, and their alkali metal salts, and the various alkali metal citrates, lactates and polyphosphates including, for instance, sodium tripolyphosphate, and sodium and potassium citrates and lactates.

When soluble calcium sequestrants are employed leading to soluble complexes, the calcium binding agents of course remain in solution and cannot be removed by physical separation techniques, but they can be removed by dialysis.

The casein following this treatment will have a calcium content below about 0.2%, based on the dry weight of the casein. It may also contain salts remaining from the treatment, possibly as by products of the calcium separation reaction. If these are not objectionable, the casein can of course, be used in that condition. However, it is desirable for many purposes to have a salt-free casein, and this is obtained in accordance with the invention by treating the casein with ion exchange resins, which will also remove any residual calcium.

While ion exchange resins can be used initially to remove calcium, the large proportion of calcium to be removed makes such an expedient too expensive and time consuming in a commercial application of the process, and the two step method outlined is preferable from this standpoint, even if salts also are to be removed.

REMOVAL OF OTHER SALT-FORMING IONS

A mixed bed of anionic and cationic exchange resins preferably is employed to facilitate control over pH and prevent damage to the casein. During deionization, the effluent should be kept at a pH of from 5.3 to about 10, preferably about 7.

In this step all ions are removed except those taken up in neutralizing the phosphoric acid and amino groups bound to casein. If ionic calcium has been precipitated with a sodium salt these bound groups will be neutralized with sodium ion; likewise, potassium salts lead to association of potassium ion with these groups, etc.

In selecting the ion exchange resins, it should be kept in mind that anionic exchange resins increase pH and cationic exchange resins decrease pH. Too strong a cationic exchange resin would not be used, for the metal ions neutralizing phosphoric acid and amino groups bound to the casein would be replaced by hydrogen and a typical acid precipitate of casein would then result. The strength of the anionic exchange resin is not as critical inasmuch as this resin will tend to increase the pH, a situation which does not lead to the formation of a casein precipitate and can be remedied by adding acid. Too high a pH should be avoided since strong alkali will damage the casein. As an anionic exchange resin Amberlite IR-45 (an amine type resin commercially available from Rohm & Haas Company) and as a cation exchange resin Amberlite IRC-50 (a carboxylic acid type resin commercially available from Rohm & Haas Company) are satisfactory. By combining the cationic and anionic exchange resins in appropriate proportions, the final pH of the effluent can be maintained within the limits indicated.

The concentration of the casein solution or dispersion to be deionized is not critical, but usually solutions or dispersions containing from 2% to 20% casein would be treated.

Ion exchange resins are not employed in the process of the invention in order to solubilize the casein. They are used to remove sodium, potassium and other salt-forming cations and anions not associated with the casein as well as the last traces of calcium remaining from treatment with the calcium sequestrant and to bring the final casein material to the correct pH and as low an ion concentration as is deemed desirable. Casein is solubilized by reducing the calcium content to below about 0.2% through treatment with the calcium sequestrant.

The effluent obtained following treatment with the ion exchange resins is in effect a solution of soluble casein in distilled water. This can be used as such, or the casein can be recovered in a pure foreign-ion free condition by drying, using any conventional procedure, such as spray-drying or tray drying.

The following examples illustrate the invention:

Example 1

Skim milk was warmed to 60° C. and immediately sufficient aqueous 5 molar calcium chloride solution was added to bring the calcium ion concentration to 0.07 molar. The pH of the milk then was 5.8. The milk was cooled rapidly and centrifuged at 6° C. and 7000×g for 30 minutes. All of the casein was thereby removed from the milk.

The centrifugate was homogenized in a Waring blender in from 1.5 to 2 times its weight of water. Two minutes' blending was adequate to disperse and homogenize the casein. Sufficient potassium oxalate solution was added to precipitate all of the calcium ion without introducing an excess of oxalate ion. In 1 to 2 minutes all of the calcium had been removed and the casein had gone into solution. The precipitate was removed by filtration.

The dispersion was then passed through a column containing a mixture of IR-45 and IRC-50 resins in the ratio of 2 parts to 1 part by volume at a rate of 0.2 cc. minute per cc. of resin. The effluent solution had a pH of 6.5 to 6.6. The solution was substantially free from soluble salt ions. Upon drying, a casein containing 0.05% calcium, based on the dry weight of the casein, was obtained. This casein readily dissolved in water to produce a solution containing up to 30% protein. The 30% solution had excellent heat stability and after heating at 100° C. for several minutes no precipitate was obtained. Electrophoretic analysis showed the presence of alpha, beta and gamma casein in the solution. The material was readily wetted by water, in contrast to the apparently water-insoluble caseins obtained by acid and isoelectric precipitation of casein.

Example 2

To skim milk at about 15° C. was added sufficient aqueous one molar calcium chloride solution to increase the calcium concentration to 0.05 molar. The solution was allowed to stand for several minutes and then centrifuged at 6° C. and 15,000×g for 15 minutes. This time could be reduced by centrifuging at a higher temperature.

The centrifugate was dispersed in twice its weight of water by homogenizing for 2 minutes in a Waring blender. 3.9 grams of potassium oxalate for each 100 cc. of centrifugate was added to precipitate calcium and the precipitate removed by centrifuging. The filtrate was deionized by passing it through a mixture of IR-45 and IRC-50 resins in the ratio of 2 to 1 by volume. The deionization was effected at room temperature and the filtrate passed through the resin at a rate of 0.2 cc. minute per cc. of resin. The effluent had a pH of from 6.5 to 6.6 and was substantially free of salt ions. This solution was dried to recover a casein powder having a calcium content of 0.05%, readily soluble in water.

The aqueous solution of casein contained alpha, beta and gamma casein and could be heated for several minutes at 100° C. without the formation of a precipitate. When added to skim milk a stabilizing effect on the protein was obtained. An equal volume of skim milk and an aqueous 8% solution of the soluble casein were mixed and dried both in air and in a freeze drying apparatus. The dried products redispersed readily in water.

The mechanism of association of casein micelles through addition of calcium ion can be explained as follows:

Calcium is visualized as binding casein molecules through the phosphoric groups. As calcium ion concentration is increased, the possibilities for association of casein micelles by calcium linkages likewise is increased, until the limiting point is reached at which all of the possible links that can be made have been made. When calcium is removed through treatment with a calcium sequestrant in the next stage of the process these links are destroyed, for the calcium sequestrant combines with free calcium ion in solution, leading to a dissociation of casein complexes to restore the equilibrium solution concentration with respect to calcium ion, and this continues until all of the complexes have been disrupted. The result is a solution of casein containing casein micelles of very small size, more or less completely dissociated into casein monomer. Thus the casein of the invention can be characterized as a monomeric casein as opposed to the polymeric state in which casein exists naturally in milk. The sequestrant has no effect upon the monomeric state of the casein.

The process of removal of ionic calcium of the invention is effective not only with casein obtained by the method described, but also with casein obtained by other precipitation methods. Of course the treatment of such casein products has no effect on such characteristics as may have been acquired by the casein due to the precipitation procedure, and if the casein has been denatured by the procedure followed, for instance, the casein will remain denatured even though ionic calcium and other ions associated therewith are removed by the process of the invention. However, through the treatment of an acid-precipitated or isoelectric casein in an aqueous medium with a calcium sequestrant, followed by treatment with an ion exchange resin to remove other ions, it is possible to obtain a casein which is more soluble in water than the acid-precipitated or isoelectric casein employed as the starting material. This casein contains other ions bound to the phosphoric acid and amino groups of the casein in place of calcium. Alkaline-precipitated caseins also can be used as a starting material and in this case as well the casein is dispersed in water, and treated with a calcium sequestrant to remove any other soluble ions which may be present in the dispersion. The product obtained is more soluble than the starting alkaline-precipitated casein.

It should be pointed out however that it is preferred from the standpoint of the desirable properties of the final product to obtain the casein from milk by the isolation method set forth in detail heretofore as producing a casein with the highest solubility, and substantially no chemical change due to denaturation or otherwise in the casein molecule, together with beneficial stabilizing properties when added to other casein solutions including milk.

The high solubility of the casein of the invention in water is thought to be due to the low calcium content and the freedom from salts, with a possibility that the method of isolation of the casein in accordance with the invention explains the higher solubility of this product, as opposed to acid-precipitated and isoelectric caseins where calcium and salt contents also have been reduced in accordance with the invention.

The soluble casein of the invention can be used as a source of soluble protein for any purpose. It can be added to either whole or skim milk or other milk products to produce a high protein milk or to deionized skim milk to produce a high protein deionized skim milk. The casein can be prepared of such purity with respect to contaminating proteins and salts that it can be used as reagent-grade casein in research work for feeding experiments, bacteriological media, digestion tests used in the measurement of enzymatic activity, as a primary standard in chemistry, amino acid analyses, for clotting time studies and as a research tool to determine the behavior of casein in milk.

The casein can also be hydrolyzed in accordance with known procedures and then used as any reagent-grade hydrolyzed casein.

The product has a high uniformity and can be used in the production of industrial products such as casein glue, casein sizers, casein fibers, etc., where it finds particular advantage in producing uniform materials. It is also useful as stabilizing material for skim milk and casein solution, as has been indicated heretofore.

All parts and percentages in the specification and claims are by weight.

I claim:

1. A process for isolating a water-soluble alkali metal caseinate from skim milk which comprises adjusting the calcium concentration of the milk to within the range from 0.05 to 0.1 molar at a temperature below about 60° C. in order to displace the ionic calcium-casein equilibrium to induce ionic calcium association of casein micelles to a water-nondispersible stage, separating calcium caseinate therefrom, and treating the calcium caseinate with a calcium sequestering agent to substitute an alkali metal for ionic calcium associated with the casein and reduce the casein calcium content to below 0.2%, based on the dry weight of the casein, and displace the ionic calcium-casein equilibrium to dissociate the ionic calcium-associated casein micelles to a water-soluble stage, the said substitution being carried out in an aqueous medium while maintaining the pH within the range from about 5.3 to about 6.5.

2. A process in accordance with claim 1 in which the calcium concentration of the milk is adjusted by adding an inorganic calcium salt to the milk.

3. A process in accordance with claim 1 in which the calcium sequestrant includes oxalate ion.

4. A process in accordance with claim 1 in which the calcium sequestrant includes citrate ion.

5. A process in accordance with claim 1 in which the calcium sequestrant includes an ethylene diamine tetraacetic acid compound.

6. A process in accordance with claim 1 in which the calcium sequestrant includes phosphate ion.

7. A process in accordance with claim 1 in which the calcium sequestrant includes sulfate ion.

8. A process in accordance with claim 1 which includes treating the caseinate with an ion exchange resin to remove calcium, and cations and anions not associated with the casein.

References Cited in the file of this patent

UNITED STATES PATENTS

| | | |
|---|---|---|
| 745,097 | Eberhard | Nov. 24, 1903 |
| 999,083 | Boechler | July 25, 1911 |
| 1,428,820 | Thomson | Sept. 12, 1922 |
| 1,600,161 | Bell | Sept. 14, 1926 |
| 2,112,558 | Coffey | Mar. 29, 1938 |
| 2,129,222 | Leviton | Sept. 6, 1938 |
| 2,191,206 | Schwartz | Feb. 20, 1940 |
| 2,225,506 | Otting | Dec. 17, 1940 |
| 2,240,116 | Holmes | Apr. 29, 1941 |
| 2,401,919 | Ender | June 11, 1946 |
| 2,669,559 | Reid | Feb. 16, 1954 |

OTHER REFERENCES

Anson et al.: "Advances in Protein Chem.," vol. 1, 128–36 (1944).